Fig_1

INVENTOR
THOMAS J. RUSSELL

Fig_2

Fig_3

Fig_4

Fig_5A

Fig_5B

Fig_7

Fig_6A

Fig_6B

Fig_8

Fig_9

Fig_12

INVENTOR
THOMAS J. RUSSELL
ATTORNEY

Fig_10

Fig_11A

Fig_11B

INVENTOR.
THOMAS J. RUSSELL

United States Patent Office 3,453,564
Patented July 1, 1969

3,453,564
CONTINUOUSLY VARIABLE HIGH-FREQUENCY TRANSMISSION LINE ATTENUATOR USING VARIABLY BIASED MICROWAVE DIODES AND METHOD THEREFOR
Thomas J. Russell, San Jose, Calif., assignor to Alfred Electronics, Palo Alto, Calif., a corporation of California
Filed Aug. 22, 1967, Ser. No. 662,376
Int. Cl. H01p 1/22, 7/38
U.S. Cl. 333—81                                       26 Claims

ABSTRACT OF THE DISCLOSURE

A high-frequency transmission line using variable-resistance microwave diodes whose resistance varies with applied bias to vary the attenuation of the wave energy passing therethrough. The variable-resistance microwave diodes are arranged along the transmission line to form one type of the lumped reactance elements of a short-line filter when subjected to a first bias, and the transmission line is configured to form the other type of the lumped reactance elements of the short-line filter. The short-line filter is designed to pass the wave energy of interest. Variable attenuation is obtained by varying the bias on all variable-resistance microwave diodes, other than the diodes at either end of the short-line filter, from said first bias to degrade the short-line filter. The bias of the end diodes is adjusted to maintain the input and output impedance of the degraded short-line filter at a constant value.

Background of the invention

*Field of the invention.*—This invention relates to high-frequency transmission line attenuators and, more particularly, to a broadband transmission line capable of variably attenuating the wave energy conducted therethrough electronically through a high attenuation range while maintaining the input and output impedance at a constant value.

It is often desirable and at times absolutely necessary to dissipate high-frequency wave energy between a source and a utilization device. For example, in applications where the source delivers a constant amount of wave energy and the requirements of the utilization device are variable, a variable attenuator between the source and the utilization device is highly useful. In other applications, the wave energy delivered to the utilization device may be required to be maintained at a constant level regardless of frequency and the wave energy source output energy may be frequency dependent in which case dissipation of wave energy above a selected power level may become necessary.

In still other types of appliactions, it may be desirable to amplitude modulate the wave energy in accordance with some control signal at a selected degree of modulation in which case dissipation of wave energy between a maximum and a minimum amplitude becomes desirable.

*Description of the prior art.*—The variable-resistance diodes utilized in practicing the instant invention are semiconductor devices having regions of intrinsic conductivity material between adjacent regions of P-type conductivity and N-type conductivity materials which exhibit a variable resistive impedance with variations of the biasing current for radio-frequency signals, and which further exhibit a substantially constant resistance for a given biasing current over a cycle of the radio-frequency signal. Such diodes are known as PIN diodes and are fully described in a paper entitled "Application Note 904," dated Feb. 15, 1966, and published by Hewlett-Packard Associates, 620 Page Mill Road, Palo Alto, Calif. Such PIN diodes have found extensive application in controlling microwaves and have been utilized heretofore in applications such as wave energy switching, limiting, duplexing, phasing and attenuating, and are also known as microwave diodes.

One prior art device capable of providing continuously controllable attenuation of a high-frequency wave energy signal, utilizing PIN diodes disposed within a transmission line, is described in U.S. Letters Patent 3,107,335 entitled "High Frequency Transmission Line Having Variable Absorption Using Variably Biased Semiconductor Devices Shunting the Line." The described device utilizes a plurality of shunt connected PIN diodes, spaced at one-quarter wavelength intervals of the mean operating wave-length along the transmission line, which are connected to a common diode biasing circuit for controlling attenuation. The maximum attenuation available from this device is a function of the number of PIN diodes utilized so that its physical length increases with its attenuation capability. For applications requiring very high attenuation, the necessary physical length is regarded as a disadvantage. Further, the required one-quarter wave-length spacing between adjacent diodes is another disadvantage of the device in that it makes the device essentially narrow-banded, the bandwidth being typically 2:1 or less.

Another prior art device, utilizing PIN diodes as an "on-off" switch, and capable of switching between a minimum and maximum attenuation condition is described in the Jan. 4, 1966 issue of "Electronic Design" on pages 118–121. That described device utilizes a plurality of shunt connected PIN diodes spaced along a transmission line as closely as possible and biased by a common diode biasing circuit which turns the diodes either fully on or fully off. The portion of the transmission line between adjacent diodes is configured to provide lumped series inductances so that the combination, with the diodes reverse or zero biased making its shunt admittance dominantly capacitive, forms a short-line low-pass filter having a cut-off frequency above the highest operating frequency. When the switch is operated, the PIN diodes are fully forward biased which cause their impedance to become dominantly inductive and resistive, thereby destroying or degrading the filter arrangement and causing the wave energy to be partially reflected and partially absorbed to produce maximum attenuation. This microwave diode device, even though extremely broadband in operation, only functions as an "on-off" switch and is not capable of providing continuously variable attenuation. When controlling the diode biasing current between the fully reverse bias (or zero bias) and the fully forward bias condition, the degradation of the filter (due to unabsorbed reflections) causes a severe mismatch of the input and output impedance which has been found intolerable in most attenuation applications.

It is therefore a primary object of the present invention to provide an improved high-frequency transmission line attenuator having an attenuation which is continuously variable between a very low value and a very high value while maintaining its input and output impedance substantially constant over the entire attenuation range, is of small physical length, and has great bandwidth.

It is also an object of the present invention to provide a high-frequency, continuously variable attenuator which is of short physical length and has a great bandwidth.

It is a further object of the present invention to provide a high-frequency, continuously variable attenuator for high-frequency wave energy which is capable of attenuating the wave energy passing therethrough through an attenuation range from below 5 db to above 30 db without causing substantial mismatch.

It is a further object of this invention to provide a wave energy transmission line attenuator capable of a continuously variable absorption to attenuate the wave energy through a range in excess of 30 db, and which is physically shorter than microwave diode attenuators used heretofore.

It is still a further object of this invention to provide a novel high-frequency PIN diode controlled transmission line which has a bandwidth in excess of 12:1, and which allows the wave energy passing therethrough to be continuously variably attenuated over a range in excess of 30 db while maintaining a substantially constant input and output impedance.

Summary of the invention

In accordance with this invention, there is provided a high-frequency transmission line of the type capable of propagating the TEM-mode, such as a coaxial transmission line. A plurality of microwave diodes such as PIN diodes are disposed within and along the transmission line to form one of the reactive components of a short-line filter, and the transmission line is provided with means for forming the other reactive component of such a filter. Usually, but not necessarily, the microwave diodes are biased to provide the shunt capacitance and the means provided in the tarnsmission line form the series inductance. The plurality of microwave diodes includes at least one diode disposed at each end of the operative section of the short-line filter portion of the transmission line which are referred to as the "end-diodes," and other diodes disposed between the end-diodes are referred to as the "filter-diodes" for reasons which will become more evident from the ensuing description. The end-diodes may or may not form a part of the filter portion. The filter-diodes are connected to a filter-diode biasing circuit, and the end-diodes are connected to an end-diode biasing circuit. When changing the filter-diode biasing current (also referred to as the attenuation signal), the filter is degraded and the wave energy passing therethrough is attenuated. Since the degraded filter causes reflection, the end-diodes are biased to absorb these reflections and to maintain the input and output imepdance at a constant value. For every value of filter-diode biasing current there is a specific and unique end-diode biasing current (also referred to as the impedance restoring signal) which will maintain the input and output impedance substantially constant.

In one embodiment of the instant invention, a coaxial transmission line is provided with four PIN filter-diodes which are connected in shunt with the transmission line in pairs. The distance between the pairs is kept at a minimum and must be less than one-quarter of the smallest operative wavelength. The center conductor portion between the filter-diode pairs is reduced in diameter to furnish the required lumped series inductance to generate a short-line low-pass filter in combination with the filter-diodes when zero (or reverse) biased. The transmission line is further provided with two PIN end-diodes connected in series with the center conductor on either side of the filter-diodes. The filter-diodes are connected to a filter-diode biasing circuit which maintains them zero biased to form the filter for minimum attenuation. The end-diodes are connected to an end-diode biasing circuit which maintains them substantially fully forward biased for minimum resistance. To obtain continuously increasing attenuation, the filter-diodes are increasingly forward biased to degrade the filter. To maintain the input and output impedance constant, and incidentally to add attenuation, the end-diodes are decreasingly forward biased to increase their resistance.

Further objects and advantages of the present invention will become apparent to those skilled in the art to which the invention pertains as the ensuing description proceeds.

Brief description of the drawings

The features of novelty that are considered characteristic of this invention are set forth with particularity in the appended claims. The organization and method of operation of the invention itself will best be understood from the following description when read in connection with the accompanying drawing in which:

FIGURE 1 is a cross-sectional view of one embodiment of the continuously variable high-frequency transmission line attenuator of the present invention;

FIGURE 2 is a cross-sectional view taken along line 2—2 of FIGURE 1 showing the common ground connection of all PIN diodes;

FIGURE 3 is an enlarged fragmentary cross-sectional view of the operative section of the transmission line attenuator of FIGURE 1;

Description of the preferred embodiment

Referring now to the drawings and, more particularly, to FIGURES 1 to 3 thereof, there is shown a microwave diode, high-frequency transmission line attenuator constructed in accordance with this invention. The illustrated attenuator, generally designated by reference character 10, has a wave-energy prth defined by a coaxial transmission line 11, comprising an outer conductor 12 and a center conductor 14 supported within the outer conductor by a dielectric spacer 13.

As best seen in FIGURE 3, center conductor 14 includes a specially shaped center section 16 which is connected in series with center conductor portions 14a and 14b through a pair of oppositely poled PIN diodes D1 and D2. There are also four PIN diodes D3, D4, D5 and D6 which are connected in shunt between center section 16 and outer conductor 12, the four shunt diodes being poled in the same manner as the two series diodes so that diode biasing current either flows into or out of center section 16 from, or to, all six diodes when the same are forward biased.

The region of transmission line attenuator 10 comprising center section 16, the six PIN diodes, and the immediately adjacent portion of the outer and the center conductors will, at times, be referred to as the operating section of the attenuator since this section provides the operative effect. Since the operating section is usually designed to have an input and output impedance which is smaller than the standard 50 ohm impedance, and since transmission line attenuator 10 preferably should have a standard input and output impedance, outer conductor 12 is outwardly tapered from the operative section towards both ends to provide a broadband impedance transformer section to transform the impedance at the operating section to the standard 50 ohm impedance, as is well-known to those skilled in the art. It is to be understood that other broadband impedance transformer sections may be utilized instead, and that this tapered impedance transformer forms no part of this invention. Further, the operating section can be designed to provide any desired input and output impedance, thereby absoluting the necessity of an impedance transformer altogether.

To assure positive conductive contact between opposite contact studs of end-diode D1 with center conductor ortion 14a and center section 16, respectively, the end of center conductor portion 14a is provided with an axial bore 20a which slidingly accommodates a diode mount 21a which has an end portion for rigidly engaging diode, D1, such as by soldering the contact stud thereto. A stainless steel compression spring 22a is placed in the bottom of bore 20a and allowed to spring bias diode mount 21a in an outward direction so that the other contact stud is resiliently urged into conductive contact with the end of center section 16. Similarly, diode D2 has its contact stud soldered to a diode mount 21b which is slidingly disposed in a diode mount bore 20b which also includes a stainless steel spring 22b for urging diode D2 against the other end of center conductor section 16. In this manner, positive conductive contact between opposite contact studs of diodes D1 and D2 with center section 16 and center conductor portions 14a and 14b, respectively, is assured. A dielectric collar 24 is utilized to support center section 16 within outer conductor 12.

To assure positive conductive contact between opposite contact studs of diode D3 with center conductor 14, and outer conductor 12, there is provided a diode mount 26a which is slidingly disposed in a bore 27a within outer conductor 12 and which has one end portion shaped to rigidly engage one of the contact studs of diode D3, such as by soldering. The other contact stud of diode D3 is resiliently urged into contact with center section 16 by a stainless steel compression spring 33a, disposed in a bore 32a at the opposite end of diode mount 26a. An insulator, such as circuit board 28a is suitably mounted to outer conductor 12 (or more specifically to a suitable mounting block 25a integral with outer conductor 12) to overlie bore 27a for retaining spring 33a and for providing a surface against which the spring can urge diode D3 into contact with center section 16.

Diode mount 26a is preferably made of aluminum and has its outer peripheral surface anodized to provide DC isolation between diode D3 and outer conductor 12 (and block 25a). Circuit board 28a is provided with a conductive lead-through plug 30a which overlies the end face of spring 33a to establish a DC current path between a lead 31a, soldered or otherwise attached to lead-through 30a, and diode D3 for application of a biasing current.

Similarly, shunt diodes D4, D5 and D6 have one of their contact studs respectively mounted to diode mounts 26b, 26c and 26d which are slidingly disposed in diode mount bores 27b, 27c and 27d to urge the other contact studs against center section 16 by being spring biased by compression springs 33b, 33c and 33d disposed in bores 32b, 32c and 32d. Springs 33b, 33c and 33d are urged against lead-through plugs 30b, 30c and 30d in circuitboards 28a and 28b to which suitable diode biasing leads 31b, 31c and 31d are attached. All diode mounts 26b, 26c and 26d are DC isolated from outer conductor 12 (and blocks 25a and 25b), as described in connection with diode mount 26a, so that biasing leads 31b, 31c and 31d are isolated, DC-wise, from outer conductor 12.

To provide a diode biasing circuit for diode D1, a suitable block 40a is mounted at a suitable point to outer conductor 12 which conveniently is of the same height as block 25a so that circuit board 28a may be extended to cover a bore 41a located in block 40a. A similar block 40b, with a suitable bore 41b, may be placed on the opposite side of block 25a to provide a diode biasing circuit for diode D2 which may be of the same height as blocks 25a and 40a so that circuit board 28a may also overlie bore 41b. For convenience of handling the attenuator of FIGURE 1, another pair of blocks 40a' and 40b' may be provided on the other side of outer conductor 12 and on opposite sides of block 25b so that circuit board 28b may likewise be extended for mounting.

Bores 41a and 41b extend through outer conductor 12 and slidingly accommodate, respectively, plungers 46a and 46b. The plungers are provided with axial end bores 47a and 47b, respectively, for housing compression springs 48a and 48b for urging plungers 46a and 46b downwardly. Suitable lead-through plugs 49a and 49b in circuit board 28a are in conductive contact with springs 48a and 48b, and have soldered thereto biasing leads 50a and 50b. The lower faces 51a and 51b of plungers 46a and 46b are respectively urged against further compression spring 52a and 52b located within suitable bores 53a and 53b, in axial alignment with plungers 46a and 46b, in insulator 13 for making conductive contact between center conductor portions 14a and 14b and plungers 46a and 46b, respectively. Since center conductor portions 14a and 14b are in DC contact with contact studs of diodes D1 and D2, respectively, it is seen that a DC conductive path is provided between leads 50a and diode D1 and between lead 50b and diode D2.

Stainless steel springs 52a and 52b are compression springs which are wound as tightly as possible (maximum number of turns) and have a diameter as large as possible to provide maximum inductive reactance to the high-frequency wave energy. This results in substantially complete AC isolation between the center and the outer conductor of coaxial transmission line 11, as fully described in copending application Ser. No. 598,510, filed on Dec. 1, 1966, entitled "DC Connection Between the Outer and Inner Conductor of a TEM-Mode Transmission Line" and assigned to the same assignee as the present invention. Further, the peripheral surface of plungers 46a and 46b, preferably made of aluminum, is anodized so that the plungers are DC-wise isolated from outer conductor 12 which may therefore be used as a common DC return. Such DC isolation further allows for the individual biasing of all microwave diodes.

To complete the biasing circuit for the six microwave diodes, a common DC return connection is provided between center section 16 and outer conductor 12 as is best seen in FIGURE 2. As thereshown, dielectric collar 24, which holds center section 16 in place within outer conductor 12, is provided with a radial bore 60 which houses a stainless steel compression spring 61 whose opposite end faces are, respectively, urged into conductive contact with center section 16 and outer conductor 12. As explained in connection with springs 52a and 52b, spring 61 is dimensioned and wound for maximum AC isolation so that a good DC return is established without materially affecting the AC propagation characteristics of the transmission line.

While such a common DC bias return is eminently useful in practicing the present invention, it will readily be understood that the DC bias return may readily be isolated from outer conductor 12 in the same manner as shown and described in connection with the DC bias path from lead 50a to diode D1. Such DC isolation becomes useful in instances where not all the microwave diodes are poled in the same manner and where entirely separate biasing circuits are desirable. In such instances, DC isolation between different portions of the center conductor is readily obtainable by anodizing a center conductor joint.

Referring now to FIGURE 3, center section 16 includes a reduced diameter mid-portion 23 which provides an inductive series reactance L1 to the RF wave energy and which is selected in accordance with criteria presently to be explained. Further, to keep the lead inductance of the shunt diodes at an absolute minimum, center section 16 has two enlarged diameter sections 23a and 23b which are made as large as possible to keep the gap to be bridged by the shunt microwave diodes D3 to D6 at an absolute minimum. Finally, the distance between enlarged diameter portions 23a and 23b, which determines the distance between adjacent shunt microwave diodes, is made as small as possible so that the diode spacing along the transmission line is a minimum. Diode spacing along the line of less than one-eighth of the shortest operating wavelength is highly desirable and if this distance is much greater than one-eighth wavelength, performance deteriorates rapidly.

Figure 6A:
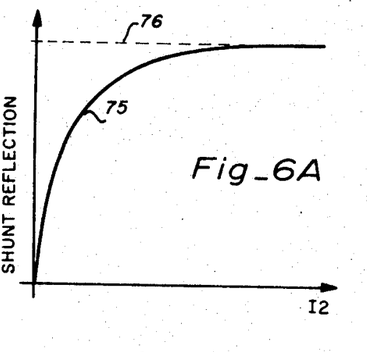
FIGURES 6A and 6B are, respectively, the graphs showing the characteristic resistance-bias current relationship for the shunt-connected and series-connected PIN diode.
Figure 6B:
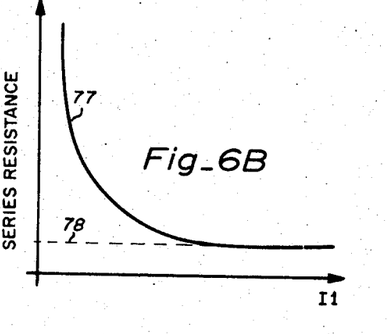
Figure 7:
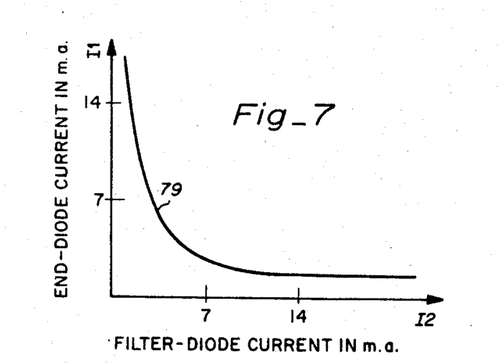
FIGURE 7 is an experimental derived graph showing the relationship between the filter-diode biasing current and the end-diode biasing current for the transmission line attenuator shown in FIGURE 1 which maintains a constant input and output impedance as the filter-biasing current, and, therefore, the attenuation is varied.

The operation of transmission line attenuator 10, shown in FIGURE 1, can best be explained by reference to its schematic diagram shown in FIGURE 4, the approximate equivalent-circuit diagrams shown in FIGURES 5A and 5B, and the graphs shown in FIGURES 6A, 6B and 7.

Figure 4:
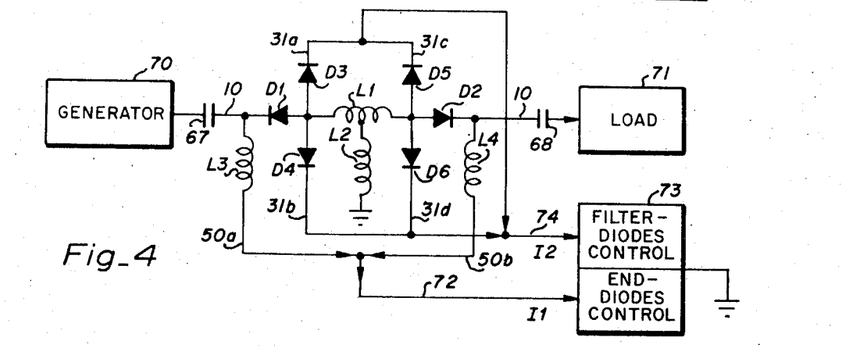
FIGURE 4 is a schematic circuit diagram of the transmission line attenuator of FIGURE 1.

Referring now to FIGURE 4, the schematic diagram thereshown represents transmission line attenuator 10 connecting a generator 70 to a load 71. Whenever possible, the reference numerals of FIGURES 1–3 are used to designate like parts. Accordingly, the series and shunt PIN diodes are identified as D1, D2, D3, D4, D5 and D6, and its diode biasing leads are identified as 50a, 50b, 31a, 31b, 31c and 31d respectively. Reduced diameter mid-portion 23 of center section 16 is identified as inductor L1 and springs 61, 53a and 53b are identified, respectively, as inductors L2, L3 and L4.

For the sake of completeness, DC block capacitors 67 and 68 are provided at either side of attenuator 10. The AC bypasses, formed by the capacitive impedance across the anodized surfaces of plungers 26a, 26b, 26c, 26d, 46a and 46b are not illustrated in the schematic diagrams for the sake of clarity. However, these capacitive bypasses connect the cathode of the diodes AC-wise to the center conductor which usually is grounded.

Inductances L2, L3 and L4 are essentially DC short circuits and AC open circuits, and are included to show the complete microwave diode biasing circuits. Diodes D1 and D2 form the end-diodes, and diodes D3, D4, D5 and D6 from the filter-diodes. Assuming that both end-diodes have identical electrical characteristics, they may be connected to a common biasing lead 72 which is connected to the end-diode biasing terminal of a function generator 73 which generates an end-diode biasing current I1 (impedance restoring signal). Similarly, if the four filter diodes have identical electrical characteristics, they may be connected to a common biasing lead 74 which is connected to the filter-diode biasing terminal of function generator 73 which generates a filter-diode biasing current I2 (attenuation signal). Function generator 73 is constructed so biasing current I1 and I2 have a predetermined relationship therebetween as will presently be explained.

Figure 5A:
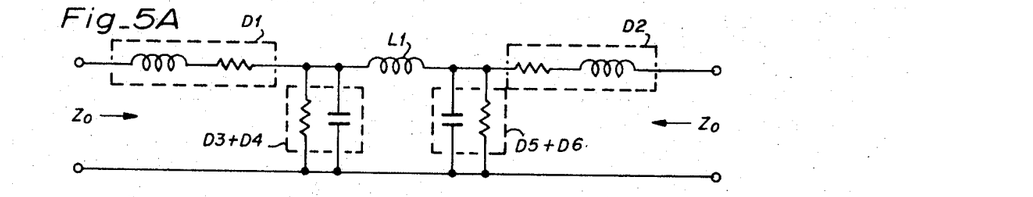
FIGURES 5A and 5B are approximated equivalent circuit diagrams of the circuit shown in FIGURE 4 illustrating, respectively, the conditions existing of minimum and maximum attenuation.

Referring now to FIGURE 5A, there is shown an approximate equivalent-circuit of the schematic of FIGURE 4 for the case where the end PIN diodes D1 and D2 are fully (or substantially so) forward biased and where the filter PIN diodes D3, D4, D5 and D6 are zero or reversed biased. The operating characteristic and the equivalent-circuit of the PIN diode are fully described in Application Note 904, dated Feb. 15, 1966, published by Hewlett-Packard Associates, Palo Alto, Calif., and entitled "THE PIN DIODE." By way of summary, when the PIN diode is reverse (or zero) biased, it aproximates the parallel combination of a resistive and a capacitive impedance and when fully forward biased it approximates the series combination of a resistive and an inductive impedance. Further, the resistance of the PIN diode is a function of the applied biasing current and decreases with increasing biasing current. For example, at zero bias the RF resistance may be of the order of 8K ohms and at 50 ma. forward bias the RF resistance is of the order of ½ ohm. The equivalent-circuit takes into account not only the junction itself but also the effect of the package which houses the junction. The entire equivalent circuit is a parallel branch network, as illustrated in the above-referenced publication, and variations of the resistive impedance either emphasize or deemphasize the branch containing the inductive or capacitive impedance.

Still referring to FIGURE 5A, assume that the filter-diodes D3, D4, D5 and D6 are zero biased and that end-diodes D1 and D2 are forward biased, as there illustrated. Under these conditions, the impedance of end-diodes D1 and D2 is small and primarily resistive (their inductance may be neglected as unimportant hereto), and the impedance of the filter-diodes D3 to D6 is primarily capacitive (their resistive impedance may also be neglected as unimportant hereto). Inductance L1, which is the series inductive impedance of the reduced mid-portion 23 of center section 16, is selected such that, in combination with the predominantly capacitive shunt filter-diodes, a short-line lowpass filter is formed. The term short-line, as used herein, refers to a filter composed of a length of line small compared with one-quarter wavelength (see Section 27–2 of "Very High-Frequency Techniques," compiled by the Staff of the Radio Research Laboratory, Harvard University, McGraw-Hill Book Company, Inc., New York, 1947). The value of the inductance L1 is derived by standard computations to provide a desired filter response, such as Chebishev or Butterworth. Accordingly, with a properly designed inductive impedance L1 for a cut-off frequency above the highest operating frequency, the circuit portion between end-diodes D1 and D2 performs like a low-pass filter with minimum attenuation when the filter-diodes are zero biased. The end-diodes, being forward biased, have little resistance and attenuator 10 operates as a transmission line with negligible attenuation.

Figure 5B:
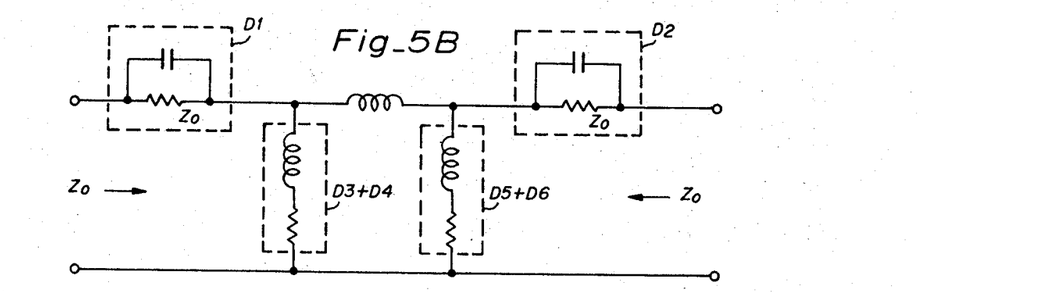

FIGURE 5B shows the approximate equivalent diagram of the circuit of FIGURE 4 when the filter-diodes are forward biased. As already stated, forward biasing a PIN diode makes the same predominantly inductive and resistive which thereby destroys or degrades the short-line filter formed by filter-diodes D3, D4, D5 and D6, and inductance L1. This causes the transmitted wave energy to be partially reflected by the degraded filter and partially aborbed by the resistive component of the filter-diodes. However, the end-diode biasing current I1 is now adjusted (decreased) to add resistive impedance to the transmission line, the exact amount being selected to maintain the input impedance constant, i.e., the same as the input impedance when the filter-diodes were zero biased. In this manner, the reflected wave energy is substantially absorbed, and an impedance match with the generator and the load is maintained. Incidentally, of course, some of the wave energy is absorbed by the upstream end-diode before reaching the short-line filter section.

For continuously varying the attenuation, the filter-diode biasing current is continuously varied. In this manner, the attenuation of the transmission line attenuator of this invention may be varied between minimum attenuation as shown by the equivalent-circuit of FIGURE 5A to maximum attenuation as shown by the equivalent-circuit of FIGURE 5B. The effect explained herein above may also be shown by the graphs of FIGURES 6A and 6B. Curve 75 is a graph showing the relationship between filter-diode biasing current I2 and the reflections caused by the degraded short-line filter. At zero biasing current, the reflections from the filter are negligible, and, as the biasing current increases, the reflection increases to a maximum value indicated by line 76. Curve 77 is a graph showing the relationship between the end-diode biasing current I1 and the resistance of the end-diodes. At maximum forward biasing current, the resistance is a minimum as presented by line 78, which may be in the range of one ohm, and at zero biasing current, the resistance is high and of the order of several kilohms.

By selecting I1 of such a magnitude that it offsets the change of the input or output impedance as the filter-diode biasing current I2 is changed, a substantially constant impedance can be maintained. Referring now to FIGURE 7, there is shown a curve 79 which depicts the relationship between I1 and I2 required to maintain the input and output impedance approximately constant. Curve 79 was experimentally derived by plotting the end-diode biasing current I1 required to maintain a constant impedance as the filter-diode biasing current I2 was varied.

Figure 12:
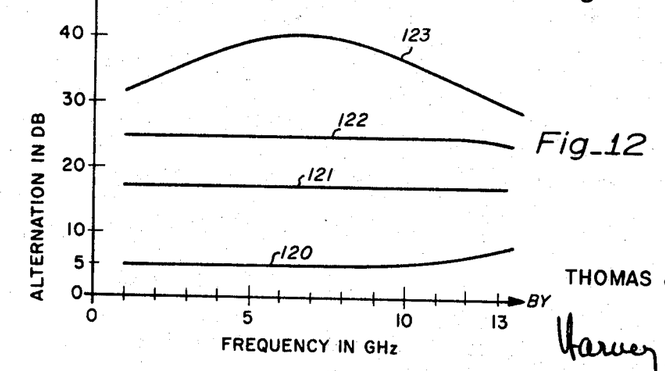
FIGURE 12 is an attenuation versus frequency diagram showing the frequency response of the transmission line attenuator of FIGURE 1.

FIGURE 12 shows the frequency response of attenuator 10 for four different values of attenuation. Curve 120 depicts the attenuation when the filter-diodes are zero biased and the end-diodes are biased in accordance with the corresponding current value derived from curve 79 of FIGURE 7. Since this is the condition providing minimum attenuation, this attenuation is the insertion loss which is less than 5 db. Curves 121, 122 and 123 show the attenuation of the wave energy with increasing filter-diode biasing current as the frequency is varied from 1 to 13 gHz. As can be seen from FIGURE 12, the attenuation range exceeds 35 db, and the attenuation is substantially constant over a frequency band of 12:1.

Figure 8:
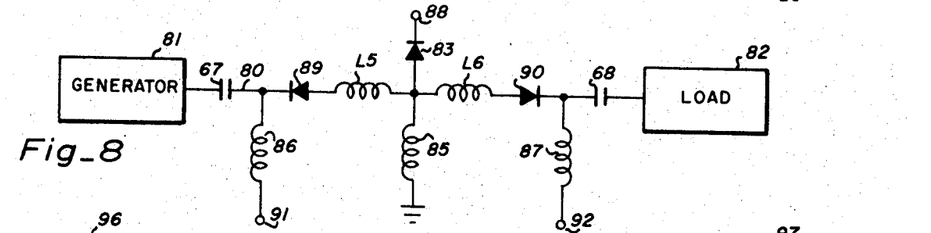
FIGURE 8 is a schematic diagram of an alternate embodiment of the continuously variable high-frequency transmission line attenuator of this invention utilizing a single filter-diode.

Referring now to FIGURE 8, there is shown in schematic circuit diagram form an alternate configuration of an operating section forming part of a transmission line 80 which is connected between a generator 81 and a load 82. Transmission line 80, which may be of any known configuration, is provided with one or more filter-diodes 83 which lie in a common plane which is perpendicular to the direction of wave energy transmission. In case of one or two filter-diodes, they are supported in the same manner as diodes D1 and D2 shown in FIGURE 1, each with its own biasing circuit. If more than two diodes are shunted across the line, they are arranged in radial fashion like the spokes of a wheel, each with its own biasing circuit. This is really the parallel shunt combination of a plurality of PIN diodes and its effect is the same, qualitatively, as that of a single PIN diode.

To construct a short-line filter, the center conductor of transmission line 80 is provided with a reduced diameter portion on either side of the filter-diode connection which are indicated as lumped series inductances L5 and L6, and which are designed to pass the frequency band of interest when the filter-diode 83 is zero biased. There are also provided a pair of end-diodes 89 and 90. A common bias circuit return is formed by a spring 85 connected between the conductors of transmission line 80 as indicated by the ground connection. End-diode biasing circuits are provided by springs 86 and 87 which connect these diodes, respectively, to biasing terminals 91 and 92. Diode 83 is connected to a filter-diode biasing terminal 88.

The operation of the transmission line attenuator of FIGURE 8 is essentially the same as that of FIGURE 1. With zero filter-diode biasing current and properly designed series inductances L5 and L6, the portion of the circuit between end-diodes 89 and 90 is essentially a short-line filter which causes negligible attenuation. End-diodes 89 and 90 are forward biased to provide minimum absorption. As filter-diode biasing current is applied through terminal 88 to diode 83, it becomes more inductive and resistive, thereby destroying the short-line filter characteristic and causing partial reflection and partial absorption of the transmitted wave energy. The amount of reflection and absorption depends on the amount of filter-diode biasing current and produces attenuation of the applied microwave energy. Also, the reflections cause an impedance mismatch with generator 81 and load 82. Simultaneously with increasing filter-diode biasing current, the end-diode biasing current is reduced to maintain a match with generator 81 and load 82 throughout the entire attenuation range.

Figure 9:
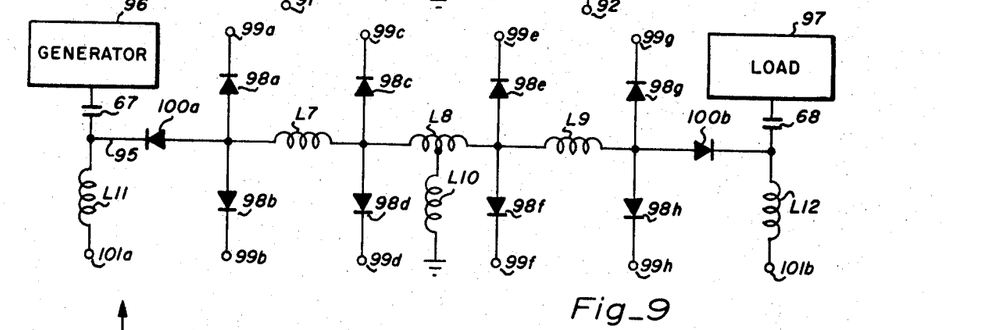
FIGURE 9 is a schematic circuit diagram of a further embodiment of the continuously variable high-frequency transmission line attenuator of this invention utilizing eight filter diodes.

Referring now to FIGURE 9, there is shown a schematic circuit diagram of a further configuration of the operating section for a transmission line attenuator in which a transmission line 95 connects a generator 96 to a load 97. Transmission line 95 is shunted by eight microwave filter diodes 98a, 98b, 98c, 98d, 98e, 98f, 98g and 98h, arranged in pairs similarly to the four filter diodes of FIGURE 1. The center conductor of transmission line 95 includes three reduced-diameter sections, one between each pair, which are indicated as lumped series inductances L7, L8 and L9. The impedance values of L7, L8 and L9 are selected such that, when the filter diodes 98 are reversed or zero biased, a short-line low-pass filter structure results whose cut-off frequency is above the highest anticipated operating frequency of the wave energy transmitted by generator 96 to load 97. Each filter diode is connected to a filter-diode biasing terminal which are indicated at 99a, 99b, 99c, 99d, 99e, 99f, 99g and 99h. The DC filter-diode biasing current path is completed by connecting the center conductor of transmission line 95 to the outer conductor or to ground through a DC short and AC open circuit indicated as L10 which may take the form of a steel compression spring as explained in connection with the embodiment shown in FIGURE 1.

There are also provided a pair of microwave end-diodes 100a and 100b, each disposed on a different side of the short-line filter, which may be biased by the application of an end-diode biasing current to terminals 101a and 101b, respectively. These terminals are connected to the center conductor of transmission line 95 through steel spring inductances L11 and L12 whose inductances are selected to provide a DC short and an AC open circuit as previously explained.

The operation of the transmission line shown in FIGURE 9 is similar to the one shown in FIGURE 1 except that the short-line filter section now comprises three pi-sections instead of one pi-section. Plural pi-sections increase the detuning of the short-line filter more rapidly and increase the absorption, and therefore allow for greater attenuation per milliampere of filter-diode biasing current. If all filter-diodes 98 are identical, all filter-diode biasing terminals 99 may be connected to a common source of filter-diode biasing current whereby the shunt diodes can be forward biased to obtain the desired degree of attenuation of the wave energy passed to load 97. Similarly, if the end-diodes 100 are identical, the end-diode biasing terminal 101 may be connected to a common source of end-diode biasing current to provide the required bias to maintain a constant impedance as the attenuation is increased. As before, when the filter-diode biasing current is zero, the end-diode biasing current is usually full forward, and it is decreased as the filter-diode biasing current is increased.

Even though FIGURE 3 illustrates the utilization of four filter-diodes arranged in two shunt pairs, FIGURE 8 illustrates one (or more) filter-diodes in what may be described as a single shunt configuration, and FIGURE 9 illustrates eight filter-diodes arranged in four shunt pairs; it is to be understood that the transmission line attenuator of this invention operates satisfactorily with any number of filter-diodes in shunt arrangement and that the filter-diodes may be arranged in pairs or may be staggered or may be connected to the same point in wagon wheel fashion when space allows. The important criterion is that the filter-diodes must provide a portion of the impedance of a short-line filter of the transmission line so that, when the biasing current is changed, the filter is degraded to provide substantially flat attenuation over a wide frequency band. In order to provide a short-line filter, close spacing is essential and often the placement of the filter-diodes is dictated by space limitations. As PIN diodes or their equivalent become available in smaller sizes, shorter short-line filter sections will become possible with several filter-diodes connected to the same point. This arrangement also improves the power handling capability of the attenuator.

Further, the end-diodes, which are primarily provided to absorb the filter reflected wave energy (even though they themselves do absorb some wave energy and thereby provide some attenuation) may be replaced by more than one PIN diode when greater resistance is desirable or necessary. However, preliminary tests have shown that a single PIN end-diode operates satisfactorily and is capable of limiting the mismatch, through an attenuation range in excess of 40 db, to less than 2.0 VSWR, and that a two-pair filter structure provides a flat response over a bandwidth from 1 gHz. to 12.4 gHz. as shown in FIGURE 12.

Figure 10:
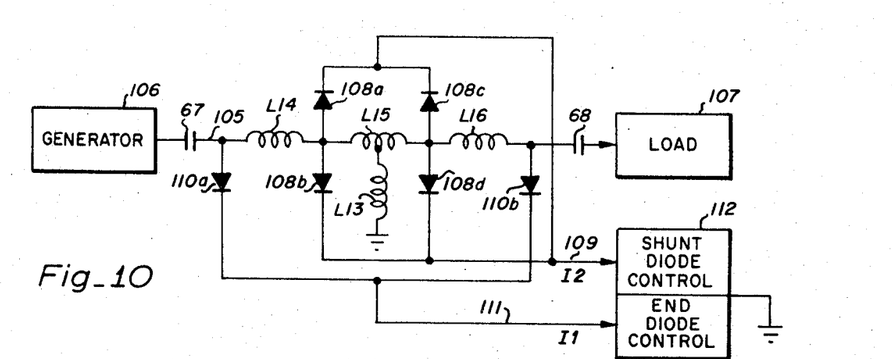
FIGURE 10 is a schematic circuit diagram of a still further embodiment of the continuously variable transmission line attenuator of this invention utilizing shunt-connected end-diodes which form a portion of the short-line filter.

Referring now to FIGURE 10, there is shown a still further embodiment of the transmission line attenuator of the present invention wherein a transmission line 105 connects a generator 106 to a load 107. Transmission line 105 is provided with four filter-diodes 108a, 108b, 108c and 108d which are connected to a common biasing circuit indicated by line 109. There is further provided a pair of end-diodes 110a and 110b which are connected in shunt across transmission line 105. A separate biasing circuit, indicated by line 111, supplies end-diode biasing current to the end diodes. A common DC return for the biasing current of all diodes is obtained by connecting the center conductor of transmission line 105 to the outer conductor (or ground) through a DC short circuit and AC open circuit represented by inductance L13 which may take the form of a compression coil spring. Finally, the center conductor of transmission line 105 has three reduced-diameter sections to provide, respectively, series inductive reactances L14, L15 and L16.

Figure 11A:
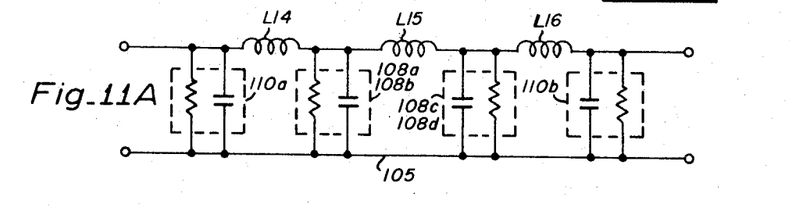
FIGURES 11A and 11B are approximate equivalent-circuit diagrams of the circuit shown in FIGURE 10 illustrating, respectively, the conditions at minimum and maximum attenuation.
Figure 11B:
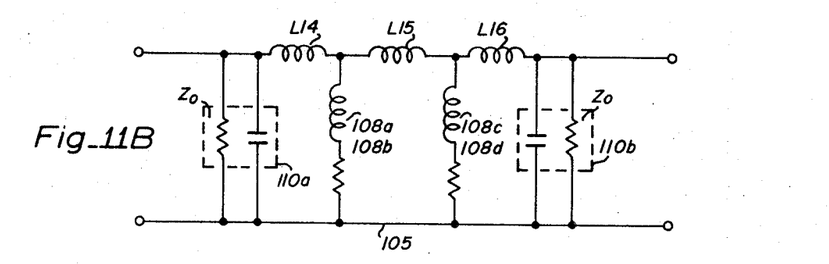

For a better understanding of the operation of the schematic circuit shown in FIGURE 10, reference is made to the approximate equivalent diagrams shown in FIGURES 11A and 11B which, respectively, indicate equivalent circuits for minimum and maximum attenuation. Referring first to FIGURE 11A, all diodes are shown as being zero biased so that they are predominantly capacitive, and end-diodes 110a and 110b form a part of the short-line low-pass filter. As described in connection with FIGURE 9, inductive impedances L14, L15 and L16 are selected so that, in combination with the filter-diodes and the end-diodes (i.e., all shunt diodes), they form a short-line low-pass filter whose cut-off frequency is above the highest operating frequency. However, care must be taken that end-diodes 110a and 110b are close to the filter-diodes 108a to 108d so that the conditions for a short-line filter are satisfied. As will presently become clearer, the arrangement of FIGURE 10 is essentially the same as the arrangement of FIGURE 9 except that the end-diodes have been omitted therefrom, and the diodes disposed at each end of the short-line filter are operated as end-diodes.

The wave energy passing through transmission line 105 is attenuated by forward biasing shunt diodes 108a, 108b, 108c and 108d so that they become predominantly inductive and resistive, as explained in connection with each previous embodiment of this invention and as shown in the approximate equivalent circuit of FIGURE 11B. This causes destruction or degradation of the short-line filter, and the fact that diodes 110a and 110b are not connected to the filter-diode biasing circuit is immaterial. However, end-diodes 110a and 110b, connected to a separate end-diode biasing circuit 111, are also forward biased but just sufficiently so as to reduce their shunt resistance to $Z_o$, the transmission line characteristic impedance. In this condition the equivalent circuit of an end-diode is approximately a capacitor in parallel with $Z_o$. Looking from an end-diode toward the center of the structure, the impedance is inductive. At the center frequency of operation each end shunt diode capacitance resonates with this inductive impedance and the resultant impedance, looking in either end of the structure is $Z_o$. Due to dependence on resonance, this device is relatively narrow band, typically an octave. It is therefore seen that, over aproximately an octave bandwidth, the impedance of a short-line filter can be maintained constant not only by a series connected diode, but also be a shunt connected diode which becomes part of the short-line filter when zero biased. This is accomplished by selecting the end-diode biasing current for the shunt diodes to maintain a constant impedance when the filter-diode biasing current is varied to vary the attenuation. A function generator 112, as shown in FIGURE 10, is constructed to provide the filter-diode biasing current to control attenuation, and the end-diode biasing current to maintain a constant impedance, the latter being selected as a predetermined function of the former.

Even though the preferred embodiment and the several alternate embodiments of the transmission line attenuator of this invention have been described as utilizing PIN diodes, it is to be understood that other diodes having equivalent characteristics may be substituted therefor. The term PIN diode, as used herein, defines any diode of the family having the characteristic of not rectifying the applied signal at the frequencies of interest, but presenting instead a resistance that is variable with the applied biasing current. Also, the term zero biasing and reverse biasing have been used loosely herein, it being understood that forward biasing refers to increasing the bias from some minimum bias at which the diode formed part of the short-line filter, whether zero bias or actual reverse bias was selected as the minimum bias. It may be desirable to select a reverse bias as the minimum bias to develop the depletion region and to reduce the dissipative losses associated with the depletion region.

While the high-frequency transmission line attenuator of this invention has been described in connection with a transmission line having a coaxial configuration in which a cylindrical center conductor is disposed within a circular outer conductor, it is to be understood that the invention is applicable to all two-wire transmission line systems capable of transmitting the TEM-mode which includes strip lines, coaxial lines which are not symmetric with respect to the axis of transmission, and a single conductor over a ground plane.

There has been described a high-frequency transmission line attenuator which is capable of attenuating a wave energy signal through a range which is in excess of 30 db, which has a bandwidth in excess of 12:1, which may be made short in comparison with the wavelength of the energy transmitted therethrough, and which has a constant input and output impedance to remain matched at all attenuations to the adjacent equipment such as a source on one end and a utilization device on the other end.

What is claimed is:

1. The method of varying the attenuation of wave energy, propagated in the TEM-mode through a suitable wave energy transmission line between a generator and a utilization device, continuously between a minimum attenuation and a maximum attenuation, said method comprising the steps of:

construction a portion of said transmission line to form a short-line filter, having a cut-off frequency which is above the highest frequency of a preselected frequency band of the wave energy to be attenuated, which transmits wave energy at said minimum attenuation;

degrading a characteristics of said short-line filter to produce an impedance mismatch for causing a preselected portion of the wave energy to be reflected to thereby decrease the amplitude of the wave energy transmitted through said short-line filter from said minimum attenuation; and maintaining the input impedance of said transmission line substantially constant by increasing the resistive impedance of the transmission line portion intermediate the short-line filter and said generator whereby the wave energy reflected by said degraded short-line filter is absorbed.

2. The method in accordance with claim 1 which includes the additional step of maintaining the output impedance of the line substantially constant by increasing the resistive impedance of the transmission line portion intermediate said short-line filter and said utilization device whereby the wave energy reflected by said utilization device is absorbed.

3. The method in accordance with claim 1 in which the short-line filter is degraded by altering the shunt reactance of said short-line filter.

4. The method in accordance with claim 1 in which the shunt impedance of said short-line filter is altered to degrade the short-line filter to cause reflection which attenuates the wave energy delivered to said utilization device and in which the resistive impedance of the transmission line on either side of said short-line filter is altered in accordance with the altered shunt impedance of said short-line filter to maintain the input and output impedances of said transmission line substantially constant and matched to said generator and said utilization device.

5. The method of varying the attenuation of wave energy, propagated in the TEM-mode through a suitable wave energy transmission line between a generator and a utilization device continuously between a minimum attenuation and a maximum attenuation, said method comprising the steps of:

constructing a portion of said transmission line to form a short-line filter, having a cut-off frequency which is above the highest frequency of a preselected frequency band of the wave energy to be attenuated, which transmits wave energy at said minimum attenuation;

degrading a characteristic of said short-line filter to produce an impedance mismatch for causing a preselected portion of the wave energy to be reflected to thereby decrease the amplitude of the wave energy transmitted through said short-line filter from said minimum attenuation; and resistively absorbing the wave energy reflected by said decreased short-line filter intermediate said short-line filter and said generator.

6. A continuously variable, high-frequency wave energy attenuator comprising:

a transmission line suitable for propagating high-frequency wave energy in the TEM-mode and including an input and output end;

short-line filter means disposed within said transmission line between its input and output end, said filter means including filter impedance means having an impedance which is continuously variable between a first condition for providing minimum attenuation and a second condition for providing maximum attenuation of the wave energy transmitted from said input to said output end;

restoring impedance means disposed within said transmission line between said input end and said filter means, said restoring impedance means having an impedance which is continuously variable over a range capable of maintaining the characteristic input impedance of said transmission line substantially constant as the filter impedance is varied between said first and second condition; and attenuation adjustment means coupled to said filter impedance means and said restoring impedance means for simultaneously varying said filter impedance and said restoring impedance such that the characteristic input impedance of said transmission line is maintained substantially constant as the filter impedance, and thereby the attenuation, is varied.

7. A continuously variable, high-frequency wave energy attenuator in accordance with claim 6 which includes a further restoring impedance means disposed within said transmission line between said filter means and said output end, said further restoring impedance means having a further restoring impedance which is continuously variable over a range capable of maintaining the characteristic output impedance of said transmission line substantially constant as said filter impedance is varied between said first and second condition, said attenuation adjustment means being coupled to said further restoring impedance means for varying said further restoring impedance such that the characteristic output impedance of said transmission line is maintained substantially constant as the filter impedance, and thereby the attenuation, is varied.

8. A continuously variable, high-frequency wave energy attenuator in accordance with claim 7 in which said restoring impedance means and said further restoring impedance means include microwave end-diodes, and said attenuation adjustment means includes an end-diode biasing circuit for variably biasing said end-diodes.

9. A continuously variable, high-frequency wave energy attenuator in accordance with claim 8 in which said filter impedance means includes at least one microwave filter-diode, and said attenuation adjustment means includes a filter-diode biasing circuit for variably biasing said filter-diode.

10. A continuously variable, high-frequency transmission line attenuator for operation with wave energy having frequencies within a preselected band of frequencies, comprising in combination:

a pair of conductors separated by a dielectric and forming a wave energy transmission line capable of transmitting the wave energy in the TEM-mode;

at least one microwave filter-diode operatively disposed within said transmission line;

lumped reactance means included within said transmission line, the reactance and position of said reactance means being selected to form, in combination with at least said filter-diode, a short-line filter which passes the preselected band of frequencies with minimum attenuation;

a microwave end-diode operatively disposed within said transmission line on either side of said short-line filter;

a first biasing circuit means connected to said filter-diode to apply an attenuation signal of variable amplitude to said filter-diode; and a second biasing circuit means connected to said end-diodes to apply an impedance restoring signal of variable amplitude to said end-diodes.

11. A transmission line attenuator in accordance with claim 10 which further includes a function generator means for supplying said attenuation signal and said impedance restoring signal and for maintaining a predetermined relationship therebetween such that the input and the output impedance of said transmission line is maintained substantially constant as the attenuation signal is varied to provide varied attenuation.

12. A transmission line attenuator in accordance with claim 11 in which said filter-diode is shunt connected across said pair of conductors.

13. A transmission line attenuator in accordance with claim 12 in which said end-diodes are connected in series with one of said pair of conductors.

14. A transmission line attenuator in accordance with claim 11 in which said transmission line is of coaxial configuration and in which said lumped reactance means comprises a reduced diameter portion in the center conductor of said transmission line.

15. A transmission line attenuator in accordance with claim 14 in which at least one filter-diode is shunt connected between the center conductor and the outer conductor of said transmission line at both sides of said reduced diameter portion and spaced apart less than one-quarter of the shortest wavelength of the band of frequencies.

16. A transmission line attenuator in accordance with claim 15 in which said end-diodes are connected in series with said center conductor on both sides of said reduced diameter portion.

17. A transmission line attenuator in accordance with claim 16 in which said filter-diodes and said end-diodes are poled so that, when forward biased, the biasing current will flow through all diodes either from or to a common terminal.

18. A transmission line attenuator in accordance with claim 17 in which said common terminal is connected to said center conductor at a point which lies between said filter-diodes.

19. A transmission line attenuator in accordance with claim 11 in which said transmission line is of coaxial configuration and in which said lumped reactance means comprises at least two reduced diameter portions in the center conductor of said transmission line which are separated less than one-quarter wavelength of the shortest wavelength of the band of frequencies, said filter-diode being connected in shunt between a point intermediate said two reduced diameter portions and the outer conductor of said transmission line.

20. A transmission line attenuator in accordance with claim 19 in which said end-diodes are connected in series with said center conductor on both sides of said reduced diameter portions.

21. A transmission line attenuator in accordance with claim 20 in which all diodes are poled so that a common biasing current flows either from or to said diodes from a portion of said center conductor.

22. A transmission line attenuator in accordance with claim 11 in which said transmission line is of coaxial configuration and in which said lumped reactance means comprises a plurality of equally spaced, reduced diameter portions in the center conductor of said transmission line, and in which at least one filter-diode is shunt connected across said transmission line on each side of each reduced diameter portion, said filter-diodes being spaced apart less than one-quarter wavelength of the shortest wavelength of the preselected band of frequencies.

23. A transmission line attenuator in accordance with claim 22 in which said end-diodes are connected in series with said center conductor.

24. A transmission line attenuator in accordance with claim 11 in which said transmission line is of coaxial configuration and in which at least two filter-diodes are connected between the center conductor and the outer conductor of said transmission line and spaced apart along said transmission line a distance less than one-quarter of the shortest wavelength of the preselected band of frequency.

25. A transmission line attenuator in accordance with claim 24 in which said lumped reactance means are series inductive impedances formed by reduced diameter portions of said center conductor, and in which said filter-diodes are shunt capacitive impedances and in which said filter-diodes are biased so that the combination of said reduced diameter portions and said filter-diodes form said short-line filter.

26. A continuously variable, high-frequency transmission line attenuator comprising in combination:
 a pair of conductors separated by a dielectric and forming a wave energy transmission line;
 at least one microwave filter-diode located along the length of said transmission line;
 at least one microwave end-diode located on one side of said filter microwave diode;
 reactance means included within said transmission line, the reactance and the position of said reactance means being selected to form, in combination with said microwave filter-diode, a short-line filter which passes a preselected band of frequencies;
 a first biasing circuit means connected to said microwave filter-diode to apply a first signal, variable in amplitude, to said microwave filter-diode;
 a second biasing circuit means connected to said microwave end-diode to apply a second signal, variable in amplitude, to said microwave-end diode; and
 function generator means for supplying said first and said second signal and for maintaining a predetermined relationship therebetween.

References Cited
UNITED STATES PATENTS

| | | |
|---|---|---|
| 2,772,377 | 11/1956 | Kazan. |
| 3,164,792 | 1/1965 | Georgiev et al. _______ 333—73 |
| 2,427,643 | 9/1947 | Collard. |
| 2,505,511 | 4/1950 | Vogel. |
| 3,346,805 | 10/1967 | Hekimian _______ 333—81 X |

HERMAN KARL SAALBACK, Primary Examiner.

P. L. GENSLER, Assistant Examiner.

U.S. Cl. X.R.

307—317, 321; 333—17, 33, 73